(12) United States Patent
Shi et al.

(10) Patent No.: US 7,697,461 B2
(45) Date of Patent: Apr. 13, 2010

(54) METHOD AND NODE FOR DISCOVERING TOPOLOGY STRUCTURE IN MULTIPROTOCOL LABEL SWITCHING RING NETWORK

(75) Inventors: Yuli Shi, Guangdong (CN); Huaixue Wan, Guangdong (CN); Xingyue Quan, Guangdong (CN); Yang Yang, Guangdong (CN)

(73) Assignee: Hua Wei Technologies Co., Ltd., Shenzhen, Guangdong (CN)

(*) Notice: Subject to any disclaimer, the term of this patent is extended or adjusted under 35 U.S.C. 154(b) by 379 days.

(21) Appl. No.: 11/695,116

(22) Filed: Apr. 2, 2007

(65) Prior Publication Data
US 2007/0230368 A1 Oct. 4, 2007

Related U.S. Application Data

(63) Continuation of application No. PCT/CN2005/001677, filed on Oct. 12, 2005.

(30) Foreign Application Priority Data
Oct. 12, 2004 (CN) .................. 2004 1 0080852

(51) Int. Cl.
H04L 12/28 (2006.01)
(52) U.S. Cl. ..................... 370/258; 370/222
(58) Field of Classification Search ............ 395/200.11; 370/351, 255, 258, 222, 909
See application file for complete search history.

(56) References Cited

U.S. PATENT DOCUMENTS 5,586,267 A * 12/1996 Chatwani et al. ............ 709/223
5,805,719 A * 9/1998 Pare et al. ................... 382/115
6,725,401 B1 4/2004 Lindhorst-Ko 2002/0186667 A1 * 12/2002 Mor et al. ................... 370/258

(Continued)

FOREIGN PATENT DOCUMENTS

CN 1547359 11/2004

(Continued)

OTHER PUBLICATIONS

Albert Herrera et al; "Framework for IP Over RPR" IETF Standard-Working-Draft, Internet Engineering Task Force; IETF, CH, vol. Iporpr, No. 1, Jun. 2001.

(Continued)

*Primary Examiner*—Dang T Ton
*Assistant Examiner*—Mandish Randhawa
(74) *Attorney, Agent, or Firm*—Darby & Darby P.C.

(57) ABSTRACT

Embodiments of the present invention provide a method and a node for discovering topology structure automatically in a Multi Protocol Label Switching (MPLS) ring network. The method includes: when receiving a topology discovering message, determining, by a node in the MPLS ring network, whether the topology discovering message is sent by the node; if yes, updating information of topology structure of the MPLS ring network stored in the node according to information of topology structure of the MPLS ring network carried by the topology discovering message; otherwise, appending information of topology structure of the node to the topology discovering message and forwarding the topology discovering message to a next node. Thus, the network topology may not depend on the topology of the physical layer network and the speed of discovering topology structure of the ring network is increased.

17 Claims, 2 Drawing Sheets

U.S. PATENT DOCUMENTS

2003/0108029 A1* 6/2003 Behzadi .................. 370/351

FOREIGN PATENT DOCUMENTS

| DE | 10260640 | 7/2004 |
|---|---|---|
| KR | 20030089604 | 11/2003 |
| WO | WO 02/078283 | 10/2002 |
| WO | WO02093999 | 11/2002 |

OTHER PUBLICATIONS

Tsiang G Suwala; "The Cisco SRP MAC Layer Protocol"; IETF Standard, Internet Engineering Task Force, IETF, CH, Aug. 2000.

* cited by examiner

METHOD AND NODE FOR DISCOVERING TOPOLOGY STRUCTURE IN MULTIPROTOCOL LABEL SWITCHING RING NETWORK

FIELD OF THE TECHNOLOGY

The present invention relates to network communication technologies, and particularly, to a method and a node for discovering topology structure in a MultiProtocol Label Switching (MPLS) ring network.

BACKGROUND OF THE INVENTION

With the development of communication network technologies and the rapid popularization of the Internet, categories, formats and service demands of network information flows become more and more abundant, and the data transport network gradually becomes unable to deal with the dispatching and switching of services of the transport layer effectively. The primary technologies adopted in the data transport network are the Synchronous Digital Hierarchy (SDH) technology, the Asynchronous Transfer Mode (ATM) technology, the Multiple Service Transport Platform (MSTP) technology and the Wave-length Division Multiplexing (WDM) technology. Therefore, the transport network urgently needs a transport ring network technology which can carry multiple types of services uniformly, provide better Quality of Service (QoS) and be extended flexibly, and is applicable to both the Metropolitan Area Network (MAN) and the Wide Area Network (WAN). In this case, a ring network based on an MPLS protocol appears.

The key of the MPLS protocol is the introduction of a Label, whose information content is short and easy to be dealt with, with local meaning and without topology information. The Label is short, thus easy to be dealt with, and may be cited directly by an index generally, and since the Label only has the local meaning, it is easy to be assigned.

In an MPLS network, a packet is encapsulated with the Label by an MPLS edge device when entering a first MPLS device. The MPLS edge device selects an appropriate Label for the packet by analyzing the content of the packet. Specifically, the MPLS edge device analyzes not only destination address information in the header of the packet but also other information in the header of the packet. And, all the nodes in the MPLS network determine whether to forward the packet according to a Label assigned. Thus, the MPLS network forwards a packet much faster than an IP network does. The Label will be separated by an edge device when the packet leaves the MPLS network.

Such a new MPLS network of ring type that applies to the transport layer is referred to as an MPLS ring network. To guarantee the reliable operation of the MPLS ring network, it requires that the MPLS ring network have a function of discovering topology structure automatically to enable each node in the network to acquire states of other nodes in the network in real time. However, there is not a perfect function of discovering topology structure automatically in the MPLS ring network yet at present.

SUMMARY OF THE INVENTION

An embodiment of the present invention provides a method and a node for discovering topology structure automatically in an MPLS ring network so as to provide a function of discovering a topology automatically to the MPLS ring network which meets demands of a transport layer well.

The method for discovering topology structure automatically in a MultiProtocol Label Switching (MPLS) ring network includes:

when receiving a topology discovering message, determining, by a node in the MPLS ring network, whether the topology discovering message is sent by the node itself;

if the topology discovering message is sent by the node itself, updating information of topology structure of the MPLS ring network stored in the node according to information of topology structure of the MPLS ring network carried by the topology discovering message;

otherwise, appending information of topology structure of the node to the topology discovering message and forwarding the topology discovering message to a next node.

The method further includes sending, by the node in the MPLS ring network, a topology discovering message to nodes in the MPLS ring network through a Label Switching Path (LSP).

An embodiment of the present invention provides a node in a MultiProtocol Label Switching (MPLS) ring network, including:

means for determining whether a topology discovering message received by the node is sent by the node;

means for updating the information of topology structure of the MPLS ring network stored in the node according to information of topology structure of the MPLS ring network carried by the topology discovering message; and means for appending information of topology structure of the node to the topology discovering message and forwarding the topology discovering message to a next node.

With the technical solution above, a function of discovering topology structure automatically may be implemented in the MPLS ring network to meet the demands of a transport layer. In addition, as can be seen from the technical solution above, the function of discovering topology structure of a logical ring network automatically in accordance with embodiments of the present invention is constructed in the MPLS layer of the MPLS ring network and thus, the dependence of the MPLS layer network topology upon topologies of the physical layer network and the MAC layer network is avoided; at the same time, the method in accordance with the embodiment of the present invention decouples the MAC frame loading in the Layer 2 (L2), which improves the mapping efficiency greatly and thereby, speeds up discovering topology structure of the MPLS ring network.

EMBODIMENTS OF THE INVENTION

For the convenience of description, the MPLS ring network is hereinafter introduced first.

Figure 1:
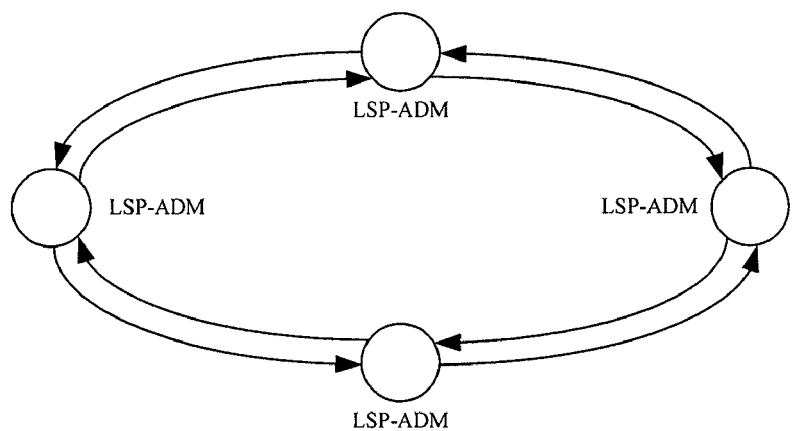
FIG. 1 shows a schematic diagram of an MPLS ring network.
Figure 2:
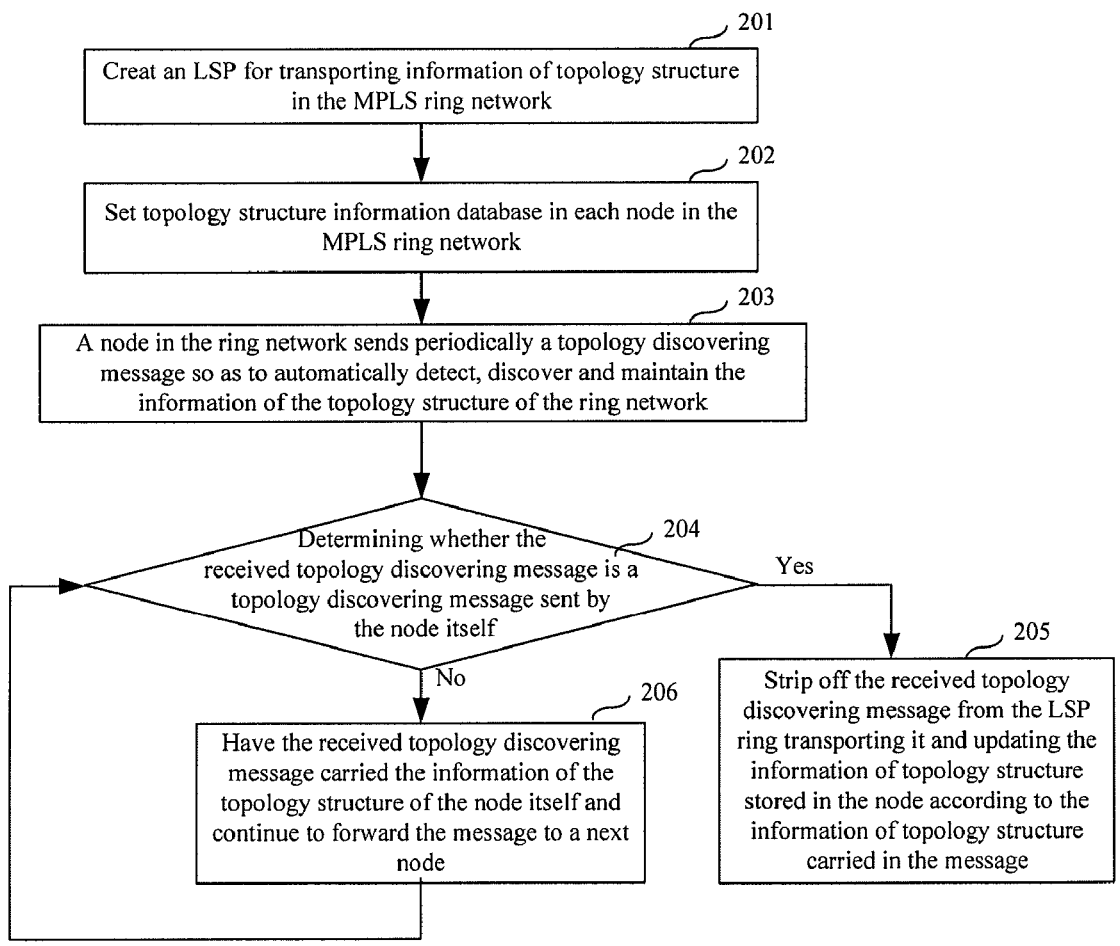
FIG. 2 shows a flowchart of a method for discovering topology structure automatically in accordance with an embodiment of the present invention.

The MPLS ring network according to embodiments of the present invention is an MPLS Label Switched Path (LSP) transport ring network constructed in a manner of logical structure mapping. As shown in FIG. 1, a transport channel entity between nodes of the ring network for transporting services is implemented by a group of LSPs based on the MPLS, and the carrier entity of the ring network is in dual-ring structure including one or more LSPs. Transport directions of the two rings are contrary and the two rings may be called an outer ring and an inner ring respectively. Multiple LSPs may be created in each of the two rings according to demands of a service amount, and different groups of LSPs are allocated for different transport flows.

In the MPLS ring network constructed, the network nodes in the MPLS ring network are Label Switched Path-Add/Drop Multiplexing (LSP-ADM) network elements with both an MPLS switching function and an ability to process adding/dropping of the rings of the service, that is, the network nodes in the MPLS ring network include functional blade or a device including a functional unit with both the MPLS switching administration and the ability of processing adding/dropping the rings of the service.

In the MPLS ring network, logical adjacent connections between each of the nodes are created, which is not limited by the topology or connection of the physical layer or by the topology or connection of the Media Access Control (MAC) layer. At the same time, an Operation and Maintenance (OAM) database and a state machine of the nodes are also created for storing information of administration and operation data of each node and controlling the processing, such as service transport of the nodes and topology updating of the nodes.

All the nodes in the MPLS ring network are peer entities, that is, any node may access any other nodes in the MPLS ring network.

Based on the MPLS ring network above, a method for discovering topology structure automatically in the MPLS ring network above in accordance with an embodiment of the present invention is given. As shown in FIG. 1, the method includes the following processes.

Step 201: create an LSP for transporting information of topology structure in the MPLS ring network.

In this process, the LSP for transporting the information of topology structure may be a dedicated LSP, i.e. a dedicated control channel LSP, or a common LSP which can transport not only service data but also control information including the information of topology structure.

In a practical application, it may be identified by an MPLS Label identification area in the LSP whether an LSP is the dedicated control channel LSP or the common LSP. In the MPLS ring network, the dedicated control channel LSP of each ring carries the control information of another ring which runs in the contrary direction.

In the MPLS ring network, the dedicated control channel LSP does not manage priority of common LSPs, that is, the dedicated control channel LSP works logically separately from common LSPs transporting service data. Moreover, the priority of the dedicated control channel LSP is the highest all the time, that is, the control data transported in the dedicated control channel LSP needs to be transported preferentially in the MPLS ring network.

Step 202: set up a database for storing the information of topology structure of the MPLS ring network in each node of the MPLS ring network.

Contents stored in the database include a node ID, service configuration and administration data, node validity state data, network protection state data, bandwidth configuration and administration data, ring network topology data, and so on.

The node ID is configured for identifying the network node in the processes of constructing and updating the topology.

The service configuration and administration data are configured for configuring services carried by the MPLS ring network.

The node validity state data are configured for dynamically indicating whether the node is valid or not.

The network protection state data are configured for providing output information of protection state of the network for services.

The bandwidth configuration and administration data are configured for configuring a bandwidth for each service carried by the network.

The ring network topology data, which are data of a dynamically inputting and outputting database of a topology discovering state machine, are configured for co-operating with the process of automatically discovering and maintaining a topology.

Step 203: each node in the MPLS ring network periodically sends a topology discovering message using the LSP created in Step 201 in the MPLS ring network so as to automatically detect, discover and maintain the information of the topology structure of the MPLS ring network.

In this process, the interval at which the node in the MPLS ring network sends the topology discovering message may be adjusted dynamically according to the configuration of the MPLS ring network.

Figure 3:
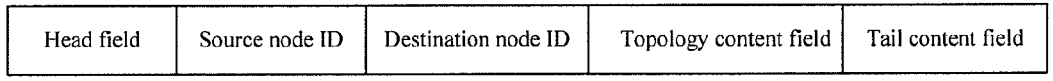
FIG. 3 shows a schematic diagram illustrating the structure of a topology discovering frame in accordance with an embodiment of the present invention.

The node in the MPLS ring network has the information of the topology structure of the MPLS ring network carried by the topology discovering message. The information of topology structure refers to the information of topology structure carried by an MPLS Topology (TP) discovering frame. As shown in FIG. 3, the structure of the MPLS TP discovering frame mainly includes a header field, a source node ID, a destination node ID, a topology content field and a tail content field.

The header field includes:

a content identification word for indicating and distinguishing whether the content of the frame is content of a topology discovering frame or common service data;

a topology data type word for describing various types of data in the topology discovering frame.

The topology content field includes:

a frame header of the topology content field, acting as a reference of Virtual Container (VC) payload shift so as to guarantee a correct access to the information of topology structure;

a ring ID word for indicating whether the ring is clockwise or anticlockwise;

a node ID, as a unique ID of a node in the ring network assigned by the MPLS ring network through defining statically or assigning dynamically for identifying the node;

a topology stabilization state bit for indicating whether the ring topology is in a stable state or not;

a topology change indicating bit for indicating that the current topology has been changed;

an adjacent node information word for recording and indicating an adjacent node, the format of the adjacent node information word being [left node, right node];

a topology message sequence word for indicating sequence of messages;

a topology type word for indicating type of a topology, such as an open ring or a closed ring;

a hop number of topology frame, for recording the number of nodes by which a topology discovering frame passes;

a topology frame timing word for defining and configuring a sending period of a topology discovering frame;

topology discovering frame lifetime for configuring lifetime of a topology discovering frame;

a node ID conflict indicator for determining whether there is an ID conflict event in the ring;

a ring network protection state word for message communication with a ring network protection mechanism;

a reserved word and an extended word for providing definition of subsequent functions, i.e. other assistant fields for extended use in the future.

The tail content field is configured for carrying a topology content frame and an MPLS frame verification word.

Figure 4:
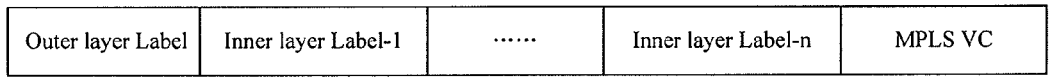
FIG. 4 shows a schematic diagram illustrating the structure of an MPLS message in accordance with an embodiment of the present invention.

In the method in accordance with this embodiment, the MPLS TP discovering frame may be carried by an MPLS Label field of a topology discovering message or in an MPLS VC field. At the same time, n layers of Labels may be pressed into the topology discovering message based on demands to carry the MPLS TP discovering frame integrally. The value of n can be extended based on demands according to the number of the nodes and the process of pressing the Labels is performed by each node in the MPLS ring network. FIG. 4 illustrates the structure of a topology discovering message transported in the MPLS ring network.

In a practical application, a topology discovering message contains an MPLS TP discovering frame in the following three methods.

In a first method, the inner layer Label field of the topology discovering message is applied to carry the MPLS TP discovering frame while the outer layer Label of the topology discovering message is applied to unified management of Label assignment in the whole network.

In a second method, the MPLS VC field of the topology discovering message is applied to carrying the MPLS TP discovering frame and the inner layer Label domain of the topology discovering message is applied to identifying that the content carried by the MPLS VC field of the MPLS TP discovering message is the information of topology structure of the MPLS ring network.

In the two methods above, the topology discovering message is carried by common LSPs.

In a third method, a dedicated control channel LSP is applied to carrying the information of topology structure of the MPLS TP discovering frame, that is, a dedicated LSP of control information data in a ring network is defined, and service data and control information data are carried respectively by the common LSP and the dedicated control channel LSP of which logical channels are independent of each other. Each node in the MPLS ring network can directly identify according to the value of the Label of the dedicated LSP that what the LSP transports is the information of the topology structure of the MPLS ring network, and performs a corresponding processing.

The node in the MPLS ring network is in a state of waiting for receiving a topology discovering message returned through each of the other nodes in the MPLS ring network upon sending the topology discovering message in Step 203.

Step 204: upon receiving a topology discovering message, the node in the MPLS ring network determines whether the topology discovering message received is the topology discovering message sent by the node itself. If yes, perform Step 205; otherwise, perform Step 206.

In this process, the node in the MPLS ring network can determine, according to such information contained in the topology discovering message as the LSP Label, the node ID or the source ID, whether the topology discovering message received is the topology discovering message sent by the node itself.

Step 205: strip the received topology discovering message off the LSP ring transporting it, and update the information of topology structure stored in the topology structure information database in the MPLS ring network according to the information of topology structure carried by the received topology discovering message.

Thus, each node in the MPLS ring network will pass the information of the topology structure of the MPLS ring network to the topology structure information database of the node itself and updates the topology structure information database. Thereby, discovering, reporting and maintaining the ring topology are automatically implemented.

Step 206: have the information of the topology structure of the node itself carried by the received topology discovering message, and keep forwarding the received topology discovering message to a next node. Then return to Step 204.

The information of the topology structure of the node itself refers to the adjacent relation between the node and its adjacent nodes, i.e. the ID of its left node and the ID of its right node. In this process, the node in the MPLS ring network writes the IDs of its adjacent nodes into the topology content field of the topology discovering frame contained in the received topology discovering message.

If the node itself is in a switching state, the received topology discovering message will be switched to the reverse ring to be transported. In this case, when other nodes receive the topology discovering message, the other nodes determine according to the ring ID word in the information of topology structure carried by the topology discovering message whether the received topology discovering message is a topology discovering message of the current ring. If yes, return to Step 204; otherwise, the other nodes discard the received topology discovering message instead of forwarding it on.

According to the method in accordance with this embodiment, since each node in the MPLS ring network sends the topology discovering message to a single ring or dual rings automatically and periodically, each node in the MPLS ring network can acquire the information of the topology structure of the whole MPLS ring network every other interval, record and update the topology of the MPLS ring network. Thus, information of new topology structure of MPLS ring network will be discovered by each node in the MPLS ring network during the initiation process of the MPLS ring, when adding a node to or deleting a node from the MPLS ring network, or when the switching of ring protection occurs because of a failure in a node or a disconnection of an LSP.

In another embodiment of the present invention, a node in the MPLS ring network can also directly send a topology discovering message to each node in the MPLS ring network to acquire information of the changed topology structure of the MPLS ring network during the initiation process of the MPLS ring, when adding a node to or deleting a node in the MPLS ring network, or when the switching of ring protection occurs because of a failure in a node or disconnection of an LSP.

Figure 5:
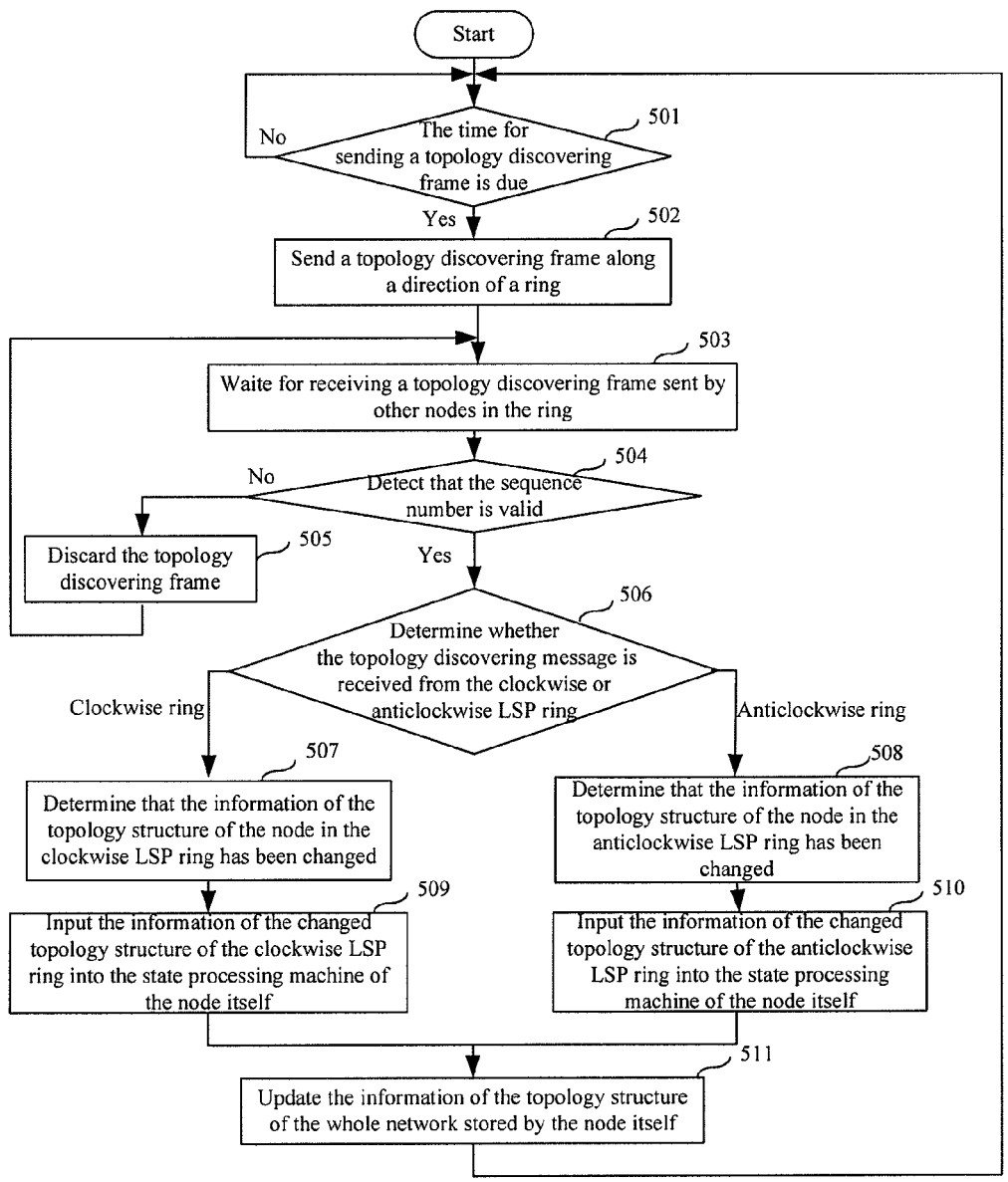
FIG. 5 shows a flowchart of a method for updating, by a node in an MPLS ring network, the information of topology structure in accordance with an embodiment of the present invention.

The process of updating, by a node in the MPLS ring network, information of topology structure is further described for better understanding of the present invention. As shown in FIG. 5, all the nodes in the MPLS ring network separately process information of topology structure, which includes the following processes.

Step 501: the node of the MPLS ring network determines whether it is time for sending a topology discovering message. If yes, perform Step 502; otherwise, keep waiting.

To update the topology structure of the MPLS ring network, each node in the MPLS ring network sends the topology discovering message to the ring network every other interval so as to update the information of topology structure stored locally. The process of determining whether it is time for sending the topology discovering message is to determine whether the interval is due. And perform Step 502 when the interval is due.

Step 502: the node sends the topology discovering message along the direction of any LSP ring in the MPLS ring network.

At the same time, the node may also send the topology discovering message to a network management system through a network state interface to provide present information of network state to the network management system.

Step 503: before receiving the topology discovering message sent by the node in Step 502, the node in the MPLS ring network that sent the topology discovering message is in the state of waiting for receiving another topology discovering message sent by other nodes, and meanwhile, waiting for the topology discovering message carrying the information of the topology structure of the MPLS ring network and sent by the node to return to the node.

In this process, upon receiving another topology discovering message sent by other nodes, the node adds information of topology structure of the node to the topology discovering message and forwards the topology discovering message to a next node in the MPLS ring network.

When the node receives the topology discovering message sent by itself in Step 502, Step 504 is performed.

Step 504: upon receiving the topology discovering message sent by the node in Step 502, the node determines whether a sequence number carried by the topology discovering message is valid. If yes, perform Step 506; otherwise, perform Step 505.

The function of the sequence number in the topology discovering message is to determine whether the topology discovering message is valid, i.e., whether the topology discovering message has passed by every node.

The operation of each node in the MPLS ring network to the sequence number is described below. An initial value is given to the sequence number sent by the node. Add 1 to or subtract 1 from the initial value each time the topology discovering message passes by one node. Thus, the value of the sequence number should be the initial value minus or plus the total number of the nodes of the network minus 1; otherwise, it shows that the topology discovering message does not go through every node in the MPLS ring network or there is a failure in a node. The node determines that the topology discovering message is invalid if the topology discovering message does not go through every node, and discards the topology discovering message, that is, the information of topology structure carried by the topology discovering message may not be used to update the information of the topology structure of the whole network stored in the node. In addition, the number of the nodes in the MPLS ring network acquired by the topology discovering frame of each node in the MPLS ring network may also be determined according to the sequence number. Specifically, if most of the nodes acquire the same information that the number of the nodes decreases, it indicates that there is a failure of a node, and the node records the information of the failure of a node and refreshes the number of the nodes of the MPLS ring network in the information of topology structure.

Step 505: return to Step 503 before processing the topology discovering message.

Step 506: determine whether the topology discovering message is received in the clockwise LSP ring or in the anticlockwise LSP ring. If in the clockwise LSP ring, perform Step 507; otherwise, perform Step 508.

Steps 507 and 509: determine that the changed information of the topology structure is in the nodes of the clockwise LSP ring, input the changed information of the topology structure of the clockwise LSP ring to the state processing machine for updating information of topology structure, and perform Step 511.

Steps 508 and 510: determine that the changed information of the topology structure is in the nodes of the anticlockwise LSP ring, input the changed information of the topology structure of the anticlockwise LSP ring to the state processing machine for updating information of topology structure, and perform Step 511.

Step 511: the state processing machine updates the information of topology structure stored by the node in the local MPLS ring network topology structure information database and cycle back to Step 501.

The foregoing is only preferred embodiments of the present invention. The protection scope of the present invention, however, is not limited to the description above. Any change or substitution, within the technical scope disclosed by the present invention, easily occurring to those skilled in the art should be covered by the protection scope of this invention. Therefore, the protection scope of the present invention should be according to the claims.

What is claimed is:

1. A method for discovering topology structure in a MultiProtocol Label Switching (MPLS) ring network, comprising:

when receiving a topology discovering message, determining, by a node in the MPLS ring network, whether the topology discovering message is sent by the node itself;

if the topology discovering message is sent by the node itself, updating information of topology structure of the MPLS ring network stored in the node according to information of topology structure of the MPLS ring network carried by the topology discovering message;

otherwise, appending the information of the topology structure of the MPLS ring network stored in the node to the topology discovering message and forwarding the topology discovering message to a next node;

wherein the information of the topology structure of the MPLS ring network is stored in a topology structure information database in each node in the MPLS ring network;

the information of the topology structure of the MPLS ring network comprises: a node ID for identifying the node when constructing and updating the topology, service configuration and administration data for configuring a service in the MPLS ring network, node validity state data for indicating whether the node is valid or invalid, network protection state data for providing output information of a protection state of the network, bandwidth configuration and administration data for configuring bandwidth for each service carried by the network, and ring network topology data for co-operating with the process of discovering and maintaining the topology of the MPLS ring network; and the process of updating the information of the topology structure of the MPLS ring network stored in the node comprises updating the information of the topology structure of the MPLS ring network stored in the topology structure information database of the node.

2. The method of claim 1, further comprising:
sending, by the node in the MPLS ring network, a topology discovering message to nodes in the MPLS ring network through a Label Switching Path (LSP).

3. The method of claim 2, wherein the node in the MPLS ring network sends the topology discovering message periodically at a preset interval.

4. The method of claim 2, wherein the node in the MPLS ring network sends the topology discovering message when the MPLS ring network is initialized, when a node is added to or deleted from the MPLS ring network, or when protection switching occurs because of a failure of a node or a disconnection of an LSP.

5. The method of claim 2, wherein the LSP created is a common LSP capable of transporting service data and control information.

6. The method of claim 5, wherein the topology discovering message sent by the node carries the information of topology structure of the MPLS ring network in an inner layer Label field of the topology discovering message.

7. A method for discovering topology structure in a MultiProtocol Label Switching (MPLS) ring network, comprising:
sending, by a node in the MPLS ring network, a topology discovering message to nodes in the MPLS ring network through a Label Switching Path (LSP);
when receiving a topology discovering message, determining, by a node in the MPLS ring network, whether the topology discovering message is sent by the node itself;
if the topology discovering message is sent by the node itself, updating information of topology structure of the MPLS ring network stored in the node according to information of the topology structure of the MPLS ring network carried by the topology discovering message;
otherwise, appending the information of the topology structure of the MPLS ring network stored in the node to the topology discovering message and forwarding the topology discovering message to a next node;
wherein the LSP created is a common LSP capable of transporting service data and control information: the topology discovering message sent by the node carries the information of topology structure of the MPLS ring network in an MPLS virtual container field of the topology discovering message; and
an inner layer Label field of the topology discovering message identifies that a content carried by the MPLS virtual container field of the topology discovering message is the information of topology structure of the MPLS ring network.

8. The method of claim 2, wherein the LSP is a dedicated control channel LSP.

9. The method of claim 1, wherein the topology discovering message is carried by a topology discovering frame, and the information of topology structure of the MPLS ring network carried by the topology discovering message is carried by a topology content field of the topology discovering frame.

10. A method for discovering topology structure in a MultiProtocol Label Switching (MPLS) ring network, comprising:
when receiving a topology discovering message, determining, by a node in the MPLS ring network, whether the topology discovering message is sent by the node itself;
if the topology discovering message is sent by the node itself, updating information of topology structure of the MPLS ring network stored in the node according to information of the topology structure of the MPLS ring network carried by the topology discovering message;
otherwise, appending the information of the topology structure of the MPLS ring network stored in the node to the topology discovering message and forwarding the topology discovering message to a next node;
wherein the topology discovering message is carried by a topology discovering frame, and the information of the topology structure of the MPLS ring network carried by the topology discovering message is carried by a topology content field of the topology discovering frame; and
wherein the topology discovering frame comprises a header field, a source node ID, a destination node ID, and a tail content field for carrying content of the information of the topology structure of the MPLS ring network and a verification word of the topology discovering frame; and
the header field comprises a content identification word for indicating whether the content in the topology discovering frame is the topology discovering frame or common service data, and a topology data type word for indicating the type of data in the topology discovering frame.

11. The method of claim 1, wherein the process of determining whether the topology discovering message is sent by the node comprises determining, according to one of an LSP Label, a node ID and a source ID that are carried by the topology discovering message, whether the topology discovering message is sent by the node.

12. The method of claim 1, further comprising:
upon receiving the topology discovering message, determining according to a sequence number in the topology discovering message whether the topology discovering message is valid; and
discarding the topology discovering message if the topology discovering message is invalid.

13. A method for discovering topology structure in a MultiProtocol Label Switching (MPLS) ring network, comprising:
when receiving a topology discovering message, determining, by a node in the MPLS ring network, whether the topology discovering message is sent by the node itself;
if the topology discovering message is sent by the node itself, updating information of topology structure of the MPLS ring network stored in the node according to information of topology structure of the MPLS ring network carried by the topology discovering message;
otherwise, appending the information of topology structure of the MPLS ring network stored in the node to the topology discovering message and forwarding the topology discovering message to a next node;
the method further comprising:
upon receiving the topology discovering message, determining according to a sequence number in the topology discovering message whether the topology discovering message is valid;
discarding the topology discovering message if the topology discovering message is invalid;
wherein the process of determining whether the topology discovering message is valid comprises:
defining an initial value of the sequence number of the topology discovering message;
upon receiving the topology discovering message, determining, by the node, whether the value of the sequence number of the topology discovering message is equal to the initial value minus or plus the total number of the nodes in the MPLS ring network minus 1;

if the value is equal to the initial value minus or plus the total number of the nodes in the MPLS ring network minus 1, determining that the topology discovering message is valid; and otherwise, determining that the topology discovering message is invalid.

14. The method of claim 1, wherein the process of updating the information of topology structure of the MLPS ring network stored in the node comprises:

inputting the information of topology structure of the MPLS ring network carried by the topology discovering message to a state processing machine of the node; and updating the information of topology structure of the MPLS ring network stored in a topology structure information database of the node in the MPLS ring network.

15. A node for discovering topology structure automatically in a Multi Protocol Label Switching (MPLS) ring network, comprising:

means for determining whether a topology discovering message received by the node is sent by the node itself;

means for updating information of topology structure of the MPLS ring network stored in the node according to information of topology structure of the MPLS ring network carried by the topology discovering message; and means for appending the information of the topology structure of the MPLS ring network stored in the node to the topology discovering message and forwarding the topology discovering message to a next node;

a topology structure information database for storing the information of the topology structure of the MPLS ring network, wherein updating the information of the topology structure of the MPLS ring network stored in the node comprises updating the information of the topology structure of the MPLS ring network stored in the topology structure information database of the node, and the information of the topology structure of the MPLS ring network comprises: a node ID for identifying the node when constructing and updating the topology, service configuration and administration data for configuring a service in the MPLS ring network, node validity state data for indicating whether the node is valid or invalid, network protection state data for providing output information of a protection state of the network, bandwidth configuration and administration data for configuring a bandwidth for each service carried by the network, and ring network topology data for co-operating with the process of discovering and maintaining the topology of the MPLS ring network.

16. The node of claim 15, further comprising means for sending the topology discovering message to nodes in the MPLS ring network through a Label Switching Path (LSP) created.

17. The node of claim 15, further comprising means for discarding the topology discovering message if determining according to a sequence number in the topology discovering message that the topology discovering message is invalid.

* * * * *